June 5, 1962 C. P. HERMANN 3,037,643
PIVOTING AND MOBILE HOISTING CONTRIVANCES
Filed Feb. 17, 1960
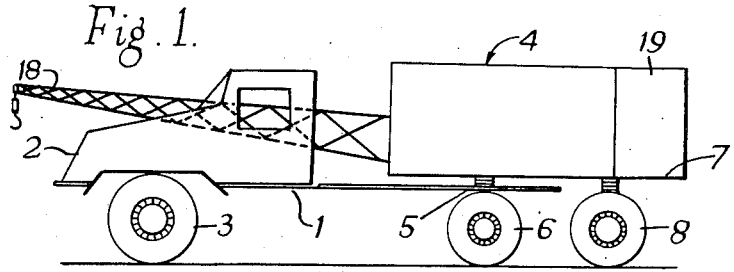
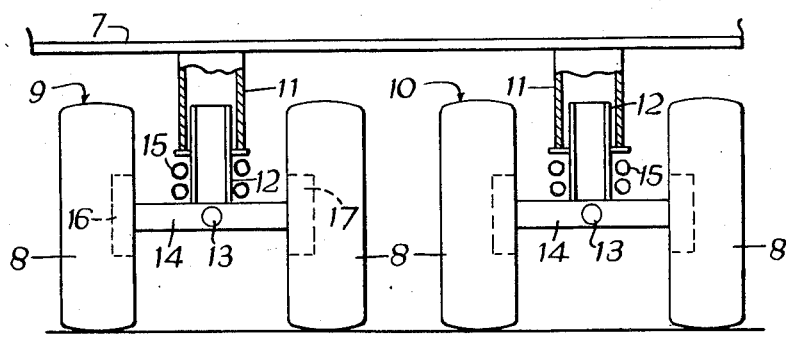
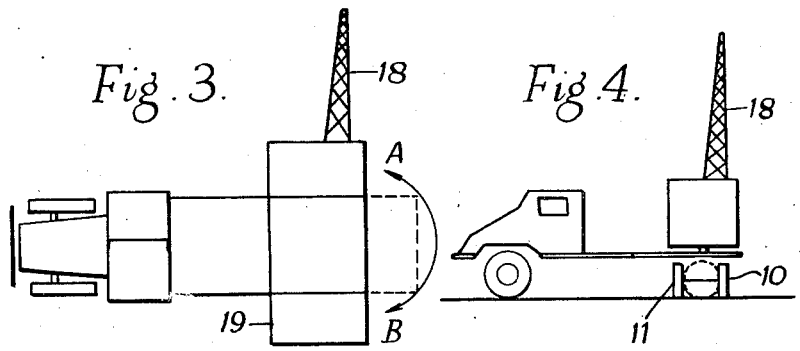
INVENTOR:
CHRISTIAN PIERRE HERMANN З,037,643
PIVOTING AND MOBILE HOISTING
CONTRIVANCES
Christian Pierre Hermann, 70 Blvd. Gavoty,
Marseille 12, France
Filed Feb. 17, 1960, Ser. No. 9,381
Claims priority, application France Dec. 24, 1959
3 Claims. (Cl. 212—145)

Mobile hoisting apparatuses, such as pivoting cranes, on lorries or other mobile contrivances, are limited in power and range.

In fact, the force components cause the jib to work in traction and compression upon the pivot, so that in order to avoid capsizing one is obliged to place an appreciable weighting on the opposite side.

This balancing is limited by the strength of the chassis, and cannot be increased indefinitely.

The object of the invention consists in the realization of a device intended to increase, by considerable proportions, the maximum hoisting load of its radius of action, without increasing the reinforcement of the tractor chassis, and relieving it of the weight of the cabin and of the weighting.

It is characterised by the means utilized, taken both as a whole and separately, and more particularly by the arrangement, behind the crane-carrier cabin pivotally mounted on the platform of the lorry or of the mobile transporter contrivance, of an orientable train of carrier wheels, independent of the rear carrier wheel assembly of the principal chassis. This second assembly of carrier wheels constitutes, on displacement of the assembly, a carrier element taking the same role as the rear wheel assembly of the lorry, but constitutes, during the use of the hoisting apparatuses, a supporting point which distributes the loads, relieving the chassis, and capable of supporting an extremely great counterweight outside the bodywork, in order to prevent all capsizing, or twisting of the pivot without overloading the motor chassis, nor unbalancing and warping.

In the accompanying drawings, which are given by way of non-limitative example of one of the forms of embodiment of the object of the invention:

FIGURE 1 shows, in elevation and as a whole, the device which is characteristic of the invention, FIGURE 2 shows diagrammatically the mounting of the supporting train fast with the pivotably mounted cabin, FIGURES 3 and 4 represents the working of the device, on different scales.

The chassis in the given example is constituted by a platform 1 with front engine 2 and steering wheel assembly 3.

On the platform there is mounted the control cabin 4 on the pivot 5. The rear supporting assembly 6 is fast with the chassis 1.

The rear part 7 of the cabin comprises what characterizes the invention—a second train of supporting wheels 8 independent of the motor chassis 1, and following the trajectory of displacement of the cabin.

This second train of wheels, fast with the cabin 4, is mounted in such a manner as to be able to be orientable under control, and sliding in the vertical plane both in order possibly to take up a difference of level of the carrying ground and for the damping of shocks.

These supporting trains 9, 10, independent of the chassis, FIGURE 2 are mounted on a fixed cylindrical framework 11 fast with the platform 7 of the cabin, in which there slides telescopically the mounting 12 connected to the spindle 13 upon which there oscillates the shaft 14 carrying hubs 16, 17 of the double wheels 19. A spring 15 damps the shocks and effects the suspension.

This device can be constituted by a hydraulic jack and, according to the power of the crane, can have only one train of single wheels. This assembly comprises any appropriate means for locking for transportation.

The advantages of this device are multiple.

On displacement of the assembly on the road, the chassis is constituted like that of an ordinary lorry, that is to say comprises a forward supporting train called the steering assembly 3, and a double rear supporting train 6, 8. The device mountable more favourably on semi-trailers where the crane can carry out a rotation through 360°.

The loads are distributed and the supporting perfectly equilibrated. The steering is not impaired at all, since the immobilised cabin 4 is in one block with the platform 1 of which it is a continuation. The train of wheels 8 is fixed in such fashion that parallelism is strictly respected. Furthermore this parallelism between the two trains 6, 8 is very easily and instantaneously adjustable and recoverable.

When the crane jib 18 (FIGURES 3 and 4) is used, the cabin is pivoted as indicated by the arrow A—B, this operation is facilitated by the possibility of orientation of the supporting trains 10, 11, FIGURE 2. The wheels are then projected at a certain distance from the chassis, and this spacing, forming a lever arm opposite to the jib, permits of supporting a very great weight outside the supporting chassis.

The counter-weight or load being able to be doubled, the load will not only be supported by the chassis 1, but by the supporting trains 10, 11. Thus the range of the jib 18 and the lifting power are doubled by the equilibration. Then the chassis becomes a contribution to stabilization of the centre of gravity, and resists overturning without any force which could cause fracture of the pivot.

The bending moments are compensated by the homogeneous and undeformable entity constituted by the trains of wheels perpendicular to the weight raised.

The balancing pivot is thus subjected now only to a resultant pressure force, and is no longer subjected to the shearing torsion force which causes its fracture, sometimes involving the overturning of the supporting chassis. Thus it can support greatly increased weights without risk of accident, in view of the points of application of the forces.

The wheels can be replaced, according to cases, by support jacks, rollers and rails, etc.

However, the forms, dimensions and arrangements of the different elements can vary within the limit of equivalence, as can the materials utilized for their manufacture, without thereby changing the general conception of the invention which has just been described.

I claim:

1. In a vehicle-mounted crane assembly which includes a first motor driven tractor chassis and a second trailer chassis provided with only rear swivel wheels, the improvement comprising a pivot point coupling said second trailer chassis to said first tractor chassis and a crane mounted rigidly on said second trailer chassis and extending both over said pivot and beyond both sides of said tractor chassis in operable position and extending over said rear swivel wheels, providing counterweight for the crane jib and revolving when said second chassis swivels at said pivot.

2. In an assembly according to claim 1 the improvement comprising rear trailer chassis wheels which swivel on independent axles.

3. In an assembly according to claim 1 the improvement comprising rear trailer wheels mounted in vertically shiftable suspensions.

References Cited in the file of this patent

UNITED STATES PATENTS

| | | |
|---|---|---|
| 1,559,880 | Ionides | Nov. 3, 1925 |
| 2,074,558 | Pirsch | Mar. 23, 1937 |
| 2,306,453 | Madden | Dec. 29, 1942 |
| 2,373,398 | Hoobler | Apr. 10, 1945 |
| 2,532,151 | Diebert et al. | Nov. 28, 1950 |
| 2,743,116 | Morrell | Apr. 24, 1956 |
| 2,818,275 | Hollowell | Dec. 31, 1957 |